(12) United States Patent
Mahr (10) Patent No.: US 6,956,831 B1
(45) Date of Patent: Oct. 18, 2005

(54) WIRELESS INITIATED MESSAGING

(75) Inventor: Eric Mahr, Jerusalem (IL)

(73) Assignee: Converse Ltd., Tel Aviv (IL)

( * ) Notice: Subject to any disclaimer, the term of this patent is extended or adjusted under 35 U.S.C. 154(b) by 781 days.

(21) Appl. No.: 09/648,537

(22) Filed: Aug. 28, 2000

(51) Int. Cl.$^7$ ............................ H04Q 7/20; H04M 3/42
(52) U.S. Cl. .................... 370/310; 455/466; 379/88.25
(58) Field of Search ............................... 370/310, 342, 370/347, 349, 493; 455/466; 379/88.25

(56) References Cited

U.S. PATENT DOCUMENTS

| 5,195,126 | A | * | 3/1993 | Carrier et al. ............... 379/45 |
| 6,292,669 | B1 | * | 9/2001 | Meuronen et al. .......... 455/466 |
| 6,512,930 | B2 | * | 1/2003 | Sandegren ................. 455/518 |
| 6,516,197 | B2 | * | 2/2003 | Havinis et al. .......... 455/456.1 |
| 6,519,771 | B1 | * | 2/2003 | Zenith ........................ 725/32 |
| 6,560,456 | B1 | * | 5/2003 | Lohtia et al. ............... 455/445 |
| 6,577,859 | B1 | * | 6/2003 | Zahavi et al. ............. 455/412.1 |
| 6,590,887 | B1 | * | 7/2003 | Lee ............................ 370/342 |
| 6,633,764 | B1 | * | 10/2003 | Garcia ........................ 455/466 |
| 6,650,891 | B1 | * | 11/2003 | Wierzbitzki et al. ..... 455/414.3 |
| 6,708,214 | B1 | * | 3/2004 | La Fleur ..................... 709/226 |
| 6,714,793 | B1 | * | 3/2004 | Carey et al. ................ 455/466 |
| 2001/0034224 | A1 | * | 10/2001 | McDowell et al. ......... 455/412 |

\* cited by examiner

*Primary Examiner*—Min Jung
(74) *Attorney, Agent, or Firm*—Sughrue Mion, PLLC (57) ABSTRACT

A wireless initiated messaging system includes a personalized message database storing therein messages predefined by or on behalf of a subscriber and in association with the subscriber and a message identifier. The system also includes a call control center coupled to the personalized message database. In response to receiving a signal containing predefined message initiation code, a message identifier identifying one of the predefined messages, and an identifier of a receiving station, the call control center retrieves the predefined message from the personalized message database and sends the retrieved predefined message to the receiving station.

32 Claims, 8 Drawing Sheets

WIRELESS INITIATED MESSAGING

BACKGROUND OF THE INVENTION

1. Field of the Invention

The present invention relates to wireless communications systems. More particularly, it relates to initiating messages from a mobile communication station.

2. Description of the Related Art

Several types of wireless communications networks are in operation today, implemented using various accessing technologies such as time division multiple access (TDMA) and code division multiple access (CDMA). Examples of wireless communications networks in place today include networks conforming with IS-136, an EIA/TIA interim standard for digital cellular systems employing TDMA, and GSM (Global System for Mobile Communications) systems which also employ TDMA.

Today's wireless telephone communications systems provide both voice and text communications services. One type of text communication service, known as Short Messages Services (SMS), enables subscribers in a communication system to send and receive short text messages on communication channels that are usually separate from the voice call channel. An SMS message intended for an individual subscriber, that is a point-to-point message, is sent through a Short Message Center (SMSC) to the specific subscriber's mobile communication station, and is known as a short message.

MT and MO Messaging

A short message that is sent from any short message entity to the mobile station, e.g., a handset, is known as a mobile terminated message (MT). Sending MT messages is referred to here as MT messaging. Today, virtually all digital communication networks support SMS service at least by providing MT messaging. This means that the mobile station can receive a message sent from some entity, but the mobile station cannot originate a message. Examples of MT messaging include the following.

1) Email-to-SMS: sending an email message from a personal computer to a mobile station;

2) Web-to-SMS: entering a network operator's web site and typing a message and sending it as an SMS message to a recipient's mobile station;

3) Paging operator: a subscriber calls a paging operator and the operator types a message that is sent to the subscriber's mobile station.

A short message that is sent from a mobile station to any other short message entity is known as a mobile originated message (MO). Sending MO messages is referred to here as MO messaging. MO messages typically are composed using the mobile station's keypad and are sent to another subscriber. The MO message is routed through the SMSC to be delivered to the other subscriber and the SMSC sends confirmation of the delivery to the sending subscriber. This two-way SMS messaging has been supported in GSM networks for many more years than in IS-41 networks (i.e., networks conforming to Interim Standard 41 (IS41), a North American standard cellular system). Although IS-41 networks can support two-way SMS it requires upgrading existing switches, i.e., the Mobile Switching Centers (MSCs).

Each network operator determines whether to charge for MO messaging and determines the amount to charge. Generally, however, it is less expensive to communicate using MO messages than it is to use a wireless voice call. Accordingly, MO messaging gives subscribers an inexpensive way to communicate directly, in a non-obtrusive manner. From a network operator's perspective providing MO messaging capabilities can generate additional revenue because the messaging can encourage voice callbacks.

Some existing networks support only MT messaging and do not support MO messaging because the network switches (i.e., the MSCs) are not upgraded to support MO messaging. These types of networks are referred to here as "non-MO networks," or "legacy networks." Whether or not the mobile stations in a non-MO network can generate MO messages is irrelevant because the network infrastructure does not support MO messages.

A problem with legacy networks is that they do not allow users to initiate messages from their mobile stations without the network's infrastructure being updated to be MO-enabled. They are limited to receiving MT messages. What is needed in this case is to provide some form of message initiation from the mobile station in a legacy network without requiring extensive upgrading of the network's infrastructure or replacing of existing non-MO-enabled mobile stations.

A network that has had its switches upgraded to support MO messaging, and hence, has the necessary infrastructure to support MO messaging, is referred to here as a "MO network." Mobile stations that are MO-enabled can perform MO messaging in a MO network. However, a MO network may also service mobile stations that are not MO-enabled. Accordingly, even though the network supports MO messaging, users with mobile stations that are not MO-enabled cannot participate in MO messaging, although they can participate in MT messaging.

A problem with MO-enabled networks is that they do not allow non-MO enabled mobile stations to originate any type of short message. Another problem with MO-enabled networks is that there are times when it is either impossible or inconvenient for a user to use a MO-enabled mobile station's MO capabilities. For example, in MO-enabled networks in order to send an MO message from a MO-enabled mobile station the user must first compose the message by typing it using the mobile station's keypad. However, it would be virtually impossible to compose a short message while, for instance, driving a car because the driver would be excessively distracted by constantly looking at the keypad and display to compose the message. Another example where MO messaging is inadequate is if the user wants to send an MO message while in a business meeting. Having to compose the message on the mobile station's keypad or even through an interactive voice response unit (IVR), while not impossible, would certainly be inconvenient and a distraction while in the meeting. What is needed here is to provide the user with predefined messages that are personalized for the user as opposed to messages defined by the network operator without regard for the specific needs of the user.

WAP-Enabled Networks and Mobile Stations

It is desirable for mobile station users to be able to access digital information, such as information available on World-Wide Web pages ("web pages"), via their mobile stations. A protocol known as the Wireless Application Protocol (WAP) has been developed to provide access, using a mobile station and through a WAP session, to information formatted to conform with WAP. A mobile station when using a WAP session in essence acts like a mini web browser on a personal computer.

Networks that support WAP connectivity are referred to here as WAP-enabled networks. A WAP-enabled network can also be enabled for MO messaging, and such a network is referred to here as a WAP-enabled MO-enabled network. However, a WAP-enabled network need not also be MO-enabled, and such a network is referred to here as a WAP-enabled/non-MO enabled network.

Many different types of networks can implement WAP, however, it initially is to be implemented on GSM networks. Newer generation cell phones with larger screens and mechanisms for scrolling the screens are being produced and will implement WAP. A mobile station that is capable of using WAP to access information is referred to here as a WAP-enabled mobile station.

A WAP-enabled mobile station communicates with a WAP server. A WAP server is a server storing information formatted according to the wireless markup language (WML) for display on a WAP-enabled mobile station. Information formatted in WML essentially corresponds to a hypertext markup language (HTML) web page stripped down for display on a mobile station's display. A WML page stored on a WAP server can allow a user to retrieve various types of digital information, such as stock quotes, banking information or virtually any type of information that is accessible from a web page. A WAP-enabled mobile station can also retrieve information from web pages that are not formatted in WML through the use of a filter that filters the HTML web page into WML for display on the WAP-enabled mobile station.

A WAP-enabled mobile station can also be MO-enabled. That is a WAP-enabled mobile station can also be enabled to generate and send MO messages, as well as receive MT messages. However, a WAP-enabled mobile station is not necessarily also MO-enabled. Accordingly, there are two varieties of WAP enabled mobile stations, a WAP-enabled and MO-enabled mobile station, and a WAP-enabled and non-MO enabled mobile station. Two other types of mobile stations can be present in a WAP-enabled network, namely, MO-enabled and non-MO enabled handsets. Accordingly, four types of mobile stations can be serviced by a WAP-enabled network, which are listed below.

1) a non WAP-enabled and non-MO enabled mobile station;
2) a non WAP-enabled and MO-enabled mobile station;
3) a WAP-enabled and non-MO enabled mobile station;
4) a WAP-enabled and MO-enabled mobile station;
The non WAP-enabled and non-MO enabled mobile station, listed as "1)" above, is also referred to here as a "legacy mobile station."

A WAP-enabled mobile station, regardless of whether or not it is MO-enabled, communicates with a WAP server over a WAP session. A WAP session is a different communications session from the voice session between the mobile station and the mobile communication network.

A problem with WAP-enabled mobile stations is that when a mobile station is in a WAP session the mobile station cannot receive or initiate a voice call, receive MT messages or initiate MO messages. That is because the WAP session is different from the mobile communication session that carries a voice call and short text messages, such as SMS messages. In order for a user to initiate or receive a voice call, or send, receive or display short text messages, such as SMS messages, the user first exit the WAP session prior to making or receiving a voice call or performing short text messaging. For example, if a user is in a WAP session and wants to listen to a voicemail message, the user must first suspend the WAP session and then in voice mode dial the voicemail system. When the user is finished with the voicemail he or she would re-enable the suspended WAP session. The WAP session would then be updated in a similar fashion to refreshing a page displayed on a web browser on a personal computer. This procedure of suspending the WAP session to use voice or data services is cumbersome for the user who wants to use a WAP session at the same time as using short text messaging or voice services.

Most of today's mobile stations do not support concurrent voice and data sessions, nor are they likely to in the near future. Some mobile telephones support concurrent sessions, however, those telephones are extremely expensive and cumbersome to use, and are not being used in the industry. Some WAP-enabled mobile-stations can receive a SMS message while in a WAP session, however, the SMS message cannot be displayed on the screen until the WAP session is suspended. Accordingly, a problem with current mobile stations is the inability to receive, view and send short messages while the mobile station is in a WAP session. This problem is not expected to change soon. Even when GPRS (General Packet Radio Service), a data communications service for enhancing GSM networks, is available the same problems will remain. This is because the GPRS-enabled mobile stations that support both voice and data communications (i.e., Type B handsets) will not support concurrent sessions.

Predefined Message Systems

A non-MO enabled network that attempts to provide some message initiation capability is a communications network provided by Cellcom. The Cellcom network provides a certain number of predefined messages available to all subscribers of its network. Hence, these messages are referred to here as "global predefined-messages," because Cellcom provides a certain number of predefined messages to all its subscribers. A subscriber can select one of the global predefined-messages by way of an interactive voice response (IVR) unit. The network operator defines the messages in advance, hence, they are predefined. Through the IVR the user can select a message from a list of global predefined-messages and designate another subscriber to receive it. Once the message is selected it is sent as a short message to the designated other subscriber.

Shortcomings of Cellcom's global predefined messaging are that all subscribers must use the same messages that are globally defined, and the subscriber must select the message through an IVR. Another drawback with the Cellcom global predefined messages is that they are not personalized by the subscriber. That is, the subscriber is limited to choosing a message defined by the network service provider.

Another problem with the Cellcom network as well as with the other networks described above is that those networks do not provide a convenient mechanism to send a short message to a more that one intended recipient, such as all the members of a distribution list. Similarly, those networks do not provide a mechanism to select one or more intended recipients from a user's personal address book (PAB).

SUMMARY OF THE INVENTION

The present invention is directed to solving the problems discussed above.

An object of the invention is to provide the capability for a user to initiate a message from a mobile station used in a wireless communications system that does not have mobile origination infrastructure.

Another object of the invention is to provide personalized messages predefined by a subscriber and the capability to select and initiate sending those personalized messages from a mobile station.

Still another object of the invention is to make it easier for users to initiate sending short messages. The invention makes it easier for a user to send a short message in situations where it would be nearly impossible, impractical or inconvenient to send a conventional MO message.

Yet another object of the invention is to allow a WAP-enabled mobile station send, receive and view short messages while concurrently displaying an active WAP session.

Another object of the invention is to generate additional revenue for service providers by causing users to perform revenue-generating operations in response to receiving a short message sent in response to a legacy mobile station initiating the sending of the short message.

Still another object of the invention is to allow users to send personalized predefined messages to a plurality of users.

To achieve these and other objects there is provided a method of sending messages in a wireless communication network. The method includes transmitting from a subscriber's mobile station to a control center a predefined message initiation code, a message identifier identifying a predefined message and an identifier of a receiving station, wherein the predefined message is defined by or on behalf of the subscriber. The method also includes receiving a message delivery notification at the mobile station indicating transmission of the retrieved personalized message to the receiving station.

To further achieve these objects there is provided a method for sending messages in a wireless communication network. The method includes receiving from a subscriber's mobile station a signal containing a predefined message initiation code, a message identifier identifying a predefined message, and an identifier of a receiving station, wherein the predefined message is defined by or on behalf of the subscriber. The method also includes retrieving the predefined message identified by the message identifier; and transmitting the retrieved predefined message to the receiving station.

There is also provided system for wireless initiated messaging. The system includes a personalized message database storing therein messages predefined by or on behalf of a subscriber and in association with the subscriber and a message identifier. It also includes a call control center coupled to the personalized message database. In response to receiving a signal containing predefined message initiation code, a message identifier identifying one of the predefined messages, and an identifier of a receiving station, the call control center retrieves the predefined message from the personalized message database and sends the retrieved predefined message to the receiving station.

There is further provided a mobile communications device that includes a display, an input unit for inputting a message number, a microprocessor, and a memory having recorded therein a computer program. The computer program is executed by the microprocessor causing a predetermined short code and the message number to be transmitted. If the message number input corresponds to a request for message information, the device receives the message information including messages predefined by or on behalf of a user and displays the received messages on the display as selectable messages.

There is also provided a method of sending messages in a wireless communication network. The method comprises originating a short message from a mobile station for transmission in the wireless communication network while the mobile station maintains an active session with an information server. The information server can be a Wireless Application Protocol (WAP) server, the session a WAP session, and the short message a Message Origination message. The method further comprises receiving a received short message and displaying on the mobile station the received short message in a field of a display controlled according to information received from the information server.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

A preferred embodiment of a messaging system and method, according to the invention is described below in detail with reference to the accompanying drawings.

Figure 1:
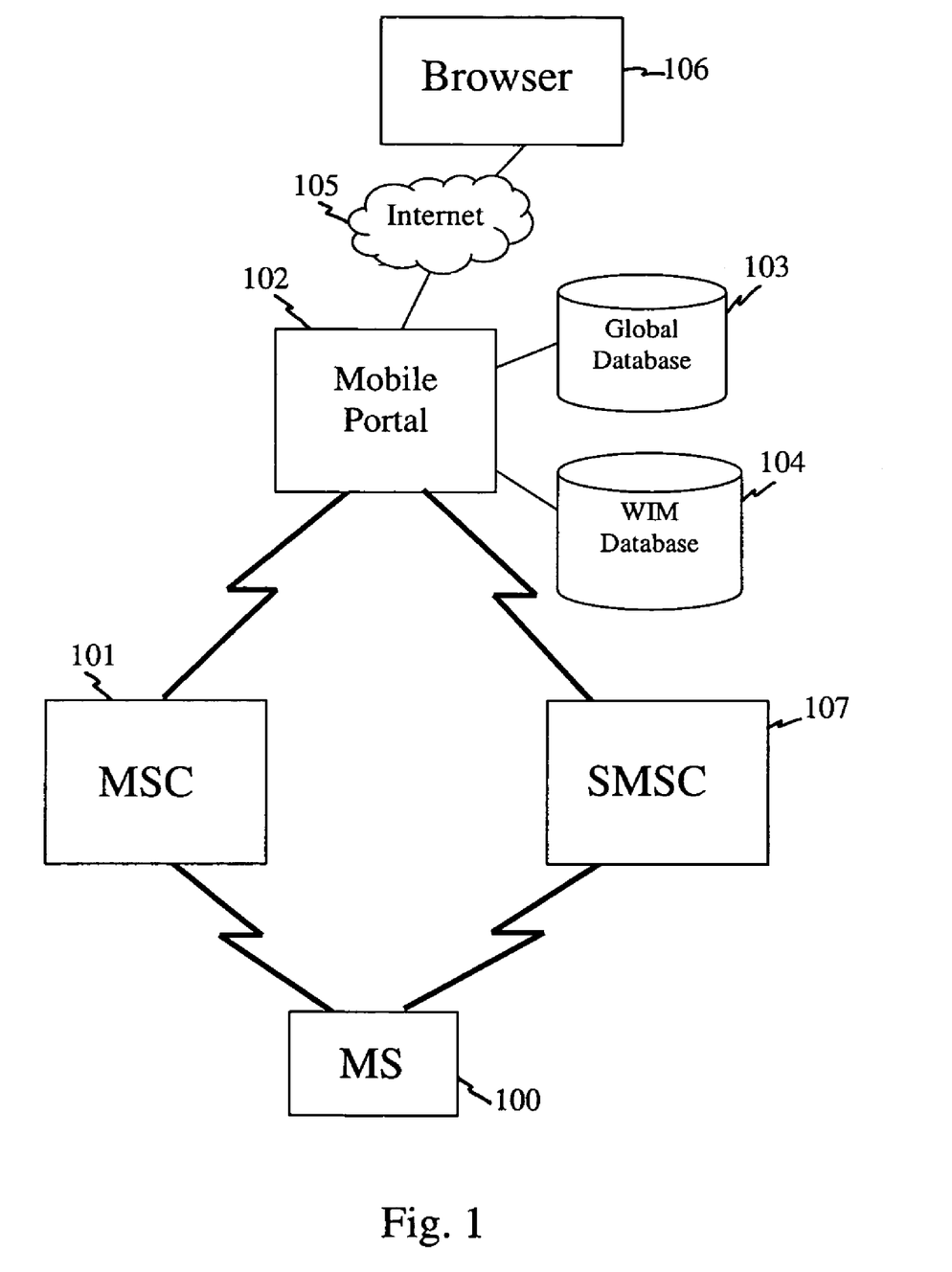
FIG. 1 is a system diagram of a messaging system according to a preferred embodiment of the invention.

Shown in FIG. 1 is a basic MO messaging architecture modified to include message initiation according the present invention. Referring to FIG. 1, a user uses a mobile station (MS) 100, or handset, to place wireless telephone calls and to transmit and receive text messages. The mobile station (MS) 100 connects via a wireless connection to a Mobile Switching Center (MSC) 101. The MSC operates to switch a voice signal to connect with another users telephone equipment. The MSC can also route a signal to a mobile portal 102. Associated with the mobile portal 102 can be a global predefined-message database 103 containing predefined messages globally available to all subscribers in the network, as discussed above in the Background section. The mobile portal 102 according to the present invention is also connected to a wireless initiated message (WIM) database 104. The WIM database 104 holds predefined text messages personalized for a specific subscriber. The personalized text messages are created by individual subscribers and are stored in WIM database 104 in association with that subscriber. In this manner WIM database 104 holds a subscriber's personalized WIM messages, predefined by the subscriber.

Also connected to the mobile portal 102, preferably by an Internet connection 105, is a browser 106. In the preferred embodiment of the invention a subscriber uses a conventional world-wide web (WWW) browser 106 to access the mobile portal 102 via an Internet connection 105 to define the subscriber's personalized WIM messages.

MS 100 also connects via a wireless connection to a Short Message Center (SMSC) 107 for sending and receiving short messages. The MSC 101, the mobile portal 102, and the SMSC 107 operate together collectively as a call control center.

Operation of the system shown in FIG. 1 is described with reference to FIGS. 2A–B and FIGS. 3A–B. The first stage in creating personalized WIM messages is stage 201 shown in FIG. 2A. In stage 201 a subscriber enters the network operator's web site and the web page designated for entering personalized messages. A subscriber enters the web site by way of browser 106 via an Internet connection 105. Once in the network operator's web site the subscriber accesses the Personalized WIM Messages web page 206, shown in FIG. 2B. This web page 206 shows a column of message numbers 207a associated with a column of WIM messages 207b, as further explained below.

Figure 2A:
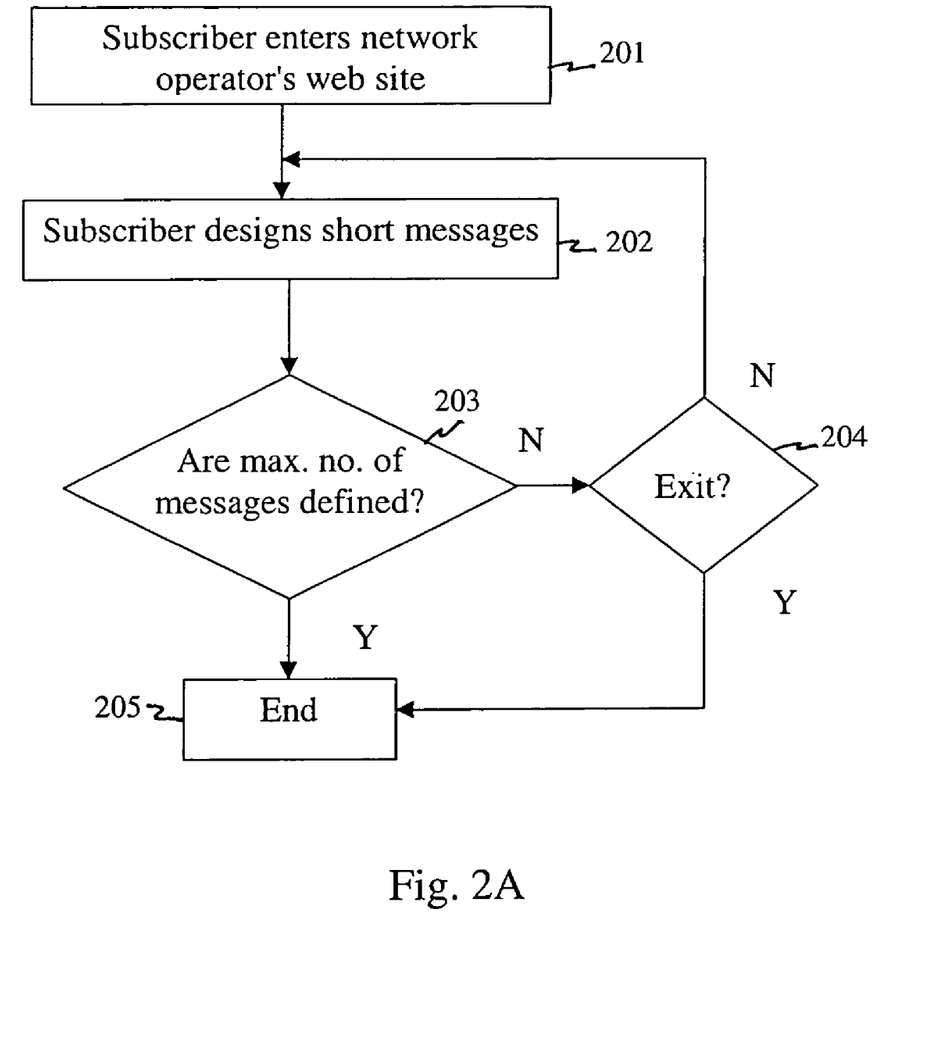
FIG. 2A is a flowchart showing how personalized messages are designed and created by a subscriber according to a preferred embodiment of the invention.
Figure 2B:
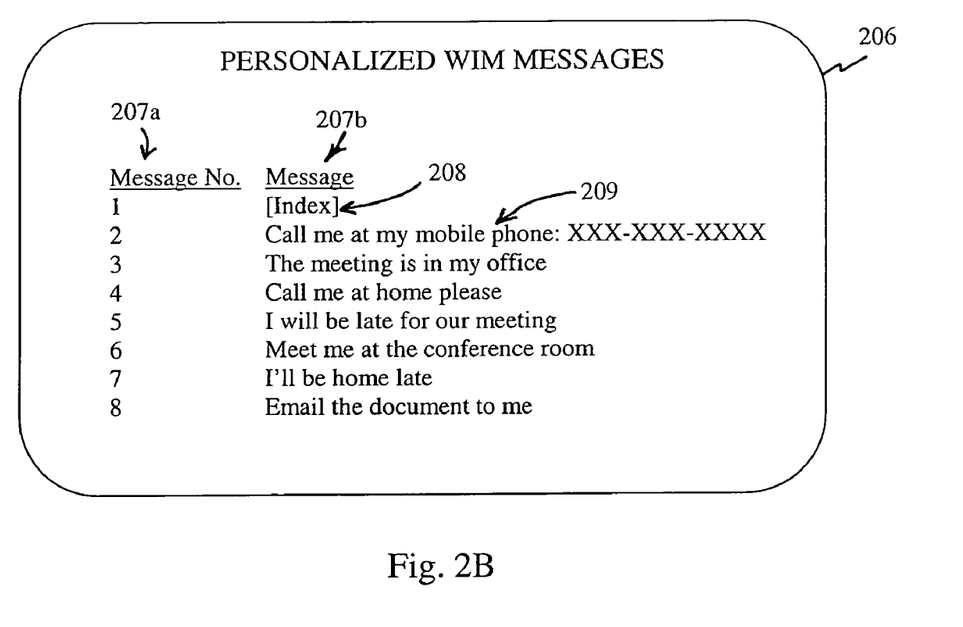
FIG. 2B is an example screen display on a handset showing the subscriber's personalized messages that are available for the subscriber to use.

The subscriber, in stage 202, designs his or her personalized WIM messages 207b by way of web page 206. In the preferred embodiment, the first message, WIM message no. 1, is a predefined message for displaying an index of the subscriber's other personalized messages. This message 208 is depicted in FIG. 2B as an index message. WIM message no. 2, indicated by reference numeral 209, is an example of a personalized WIM message the subscriber enters via web page 206. Here the subscriber creates message no. 2 as "call me at my mobile phone XXX-XXX-XXX". Preferably, the telephone number that appears in message 209 is the subscriber's actual mobile telephone number. Alternatively, however, the subscriber can designate the phone number XXX-XXX-XXXX as a special entry field the subscriber can enter when preparing to send WIM message no. 2 from his or her handset. In this manner the subscriber can specify a phone number to be included in the WIM message when sending the WIM message.

After the subscriber finishes entering the personalized WIM message it is determined at stage 203 if the maximum number of WIM messages have been defined. Preferably the maximum number of WIM entries is nine, however, the invention is not limited to this number, and the maximum number of messages can be either more or less than nine. If the maximum number of messages have been entered the WIM message creation process ends at stage 205. If the maximum number of messages have not been entered, then at stage 204 it is determined whether the subscriber wishes to exit the WIM message creation process. If so, the process ends at stage 205. However, if the subscriber does not want to exit the process, flow is returned to stage 202 to design another WIM message.

Figure 3A:
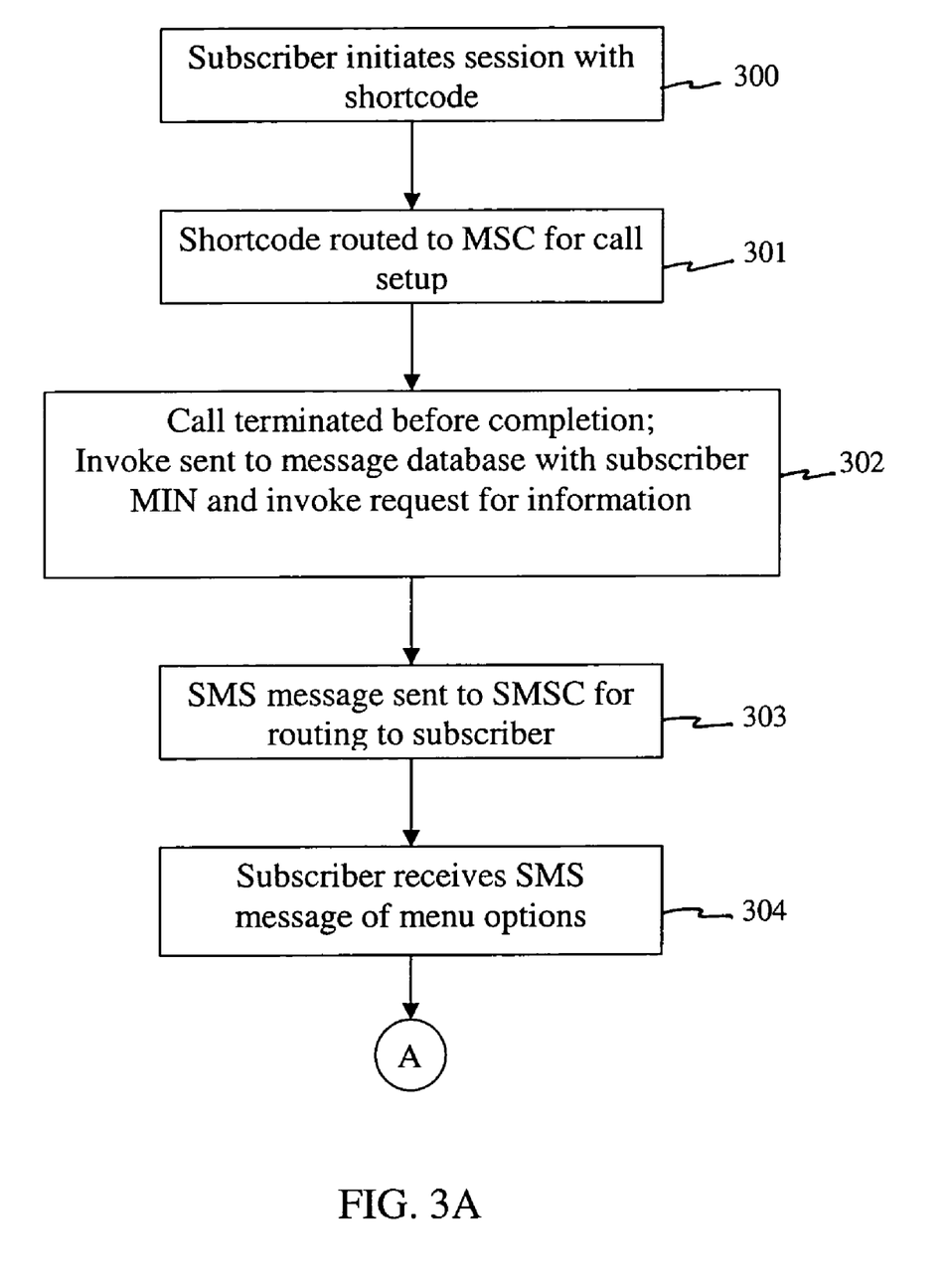
FIGS. 3A and B are flowcharts showing how messaging is performed according to a preferred embodiment of the invention.
Figure 3B:
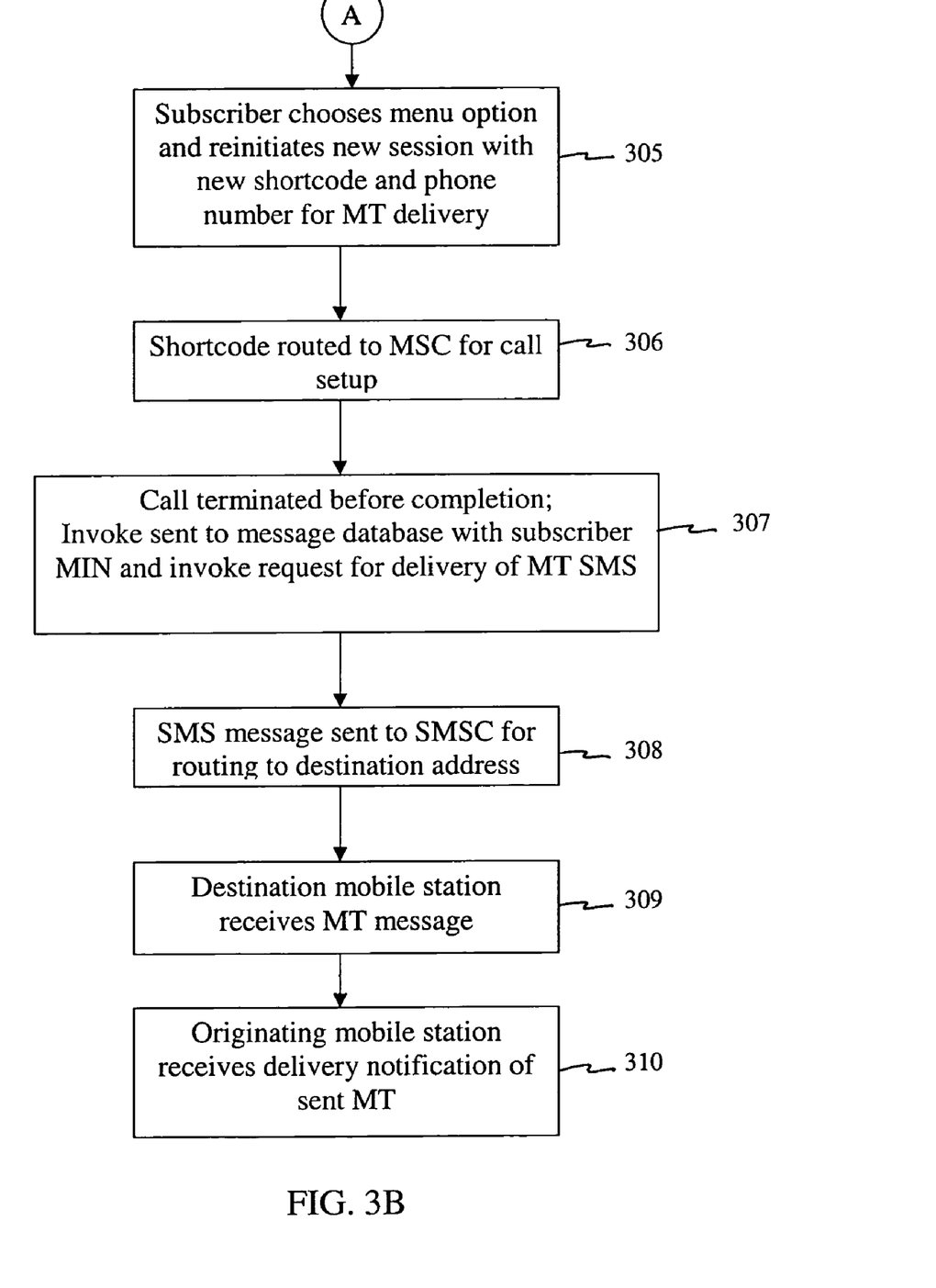

After the subscriber defines his or her personalized messages, as discussed above, the subscriber can begin using the WIM messages. FIGS. 3A and B show a preferred method for sending the WIM messages. When a subscriber decides to send a WIM message, he or she uses the mobile station 100 to initiate a WIM session, as indicated in stage 300 of FIG. 3A. The subscriber initiates the WIM session by entering a short code on the mobile station's handset. For example, the short code could be the sequence "111". Alternatively, the short code could be some other code designated by the network operator to indicate WIM messaging. Upon entering the short code 111, the subscriber also enters a digit indicating the message number to be sent. Once the short code and message number are entered they are routed to the MSC 101 for setting up a call in stage 301; however, no actual connection is made. Rather, the MSC recognizes the short code "111" (or other network operator designated code) as a special code for initiating a short message service (SMS) session.

To begin the WIM messaging process a subscriber typically would request the first WIM message number, namely WIM message number 1, to cause the index of personalized messages to be sent to the subscribers handset. The WIM message shown below would be generated in the case of the subscriber requesting the index of menu options.

1111

The short code "111" indicates WIM messaging and the following "1" indicates that the first pre-defined personalized message is requested. In this case the first message number 1 refers to an index of the subscriber's pre-defined, personalized WIM messages.

Because the subscriber specified the first WIM message, i.e. WIM message number 1, the subscriber requests that the index of the other eight defined messages be delivered to the handset. Here, in stage 302, the call is terminated before completion, and an invoke message is sent from MSC 101 to the mobile portal 102 for access to WIM database 104. Along with the invoke command, an identifier of the mobile station is sent. In an IS-41 network the mobile station would send a Mobile Identification Number (MIN). Preferably the MIN is the mobile station's telephone number. In a GSM network the mobile station's identifier is known as a MSISDN, and typically is the mobile station's telephone number. Accordingly, in a GSM network the mobile station's MSISDN would be sent. Upon receiving the invoke request, the pre-defined, personalized WIM message corresponding to the message number in the information sent from the mobile station 100 is retrieved from the WIM database 104. The mobile portal 102 communicates with the SMSC 107 to generate a short message (i.e., a SMS message) from the retrieved information and that short message is sent by SMSC 107 to the subscriber in stage 303.

Here, because the subscriber requested the index message, i.e. message number 1, and did not specify another subscriber's telephone number, the SMS message is sent back to the subscriber in stage 303. The subscriber then, in stage 304, receives the SMS message consisting of an index of the personalized WIM messages the subscriber had previously defined. Those pre-defined, personalized WIM messages are displayed to the subscriber as menu options as shown in FIG. 2B. The subscriber is now ready to select one of the WIM messages to send. Here the flow shown in FIG. 3A arrives at the connector "A" connecting to the flow shown in FIG. 3B.

As shown in FIG. 3B in stage 305, the subscriber chooses one of the menu options shown in FIG. 2B corresponding to the personalized message the subscriber intends to send. For example, the subscriber may choose message number 3. Upon selecting message number 3, a new session is initiated with the MSC 101 using a new short code and a phone number for the message termination (MT) delivery. At this point in stage 305, the subscriber is prompted for the telephone number for the intended recipient of the WIM message.

In stage 306, the short code is routed to the MSC for call set up. A preferred structure for the WIM message transmitted to a single subscriber is shown as follows.

111 3 050 32 2489.

In the above example "111" is the short code identifying WIM messaging, "3" identifies pre-defined, personalized message number 3, and "050 32 2489" refers to the telephone number of the subscriber to receive the WIM message.

In stage 307, the call is terminated before it is completed. However, the short code causes an invoke command to be sent to the WIM database 104 via the mobile portal 102 along with the subscribers MIN (the MSISDN in a GSM network) and request for delivery of the MT short message. Accordingly, the mobile portal 102 retrieves the indicated message from the WIM database 104. In this example, message number 3 is retrieved from database 104. A short message is created from the information retrieved from database 104 and sent to the SMSC 107 for routing to the destination address, as indicated in stage 308. The SMSC 107 routes the short message to the telephone number indicated by the subscriber in the WIM message. The SMSC 107 transmits the short message to the recipient's mobile station and that mobile station receives the MT message, as indicated in stage 309.

After the message is sent in stage 308 the originating mobile station is sent a delivery notification from the SMSC 107 indicating that the MT message has been sent, as shown in stage 310. Accordingly, the subscriber sending the WIM message is notified that the message was sent.

In an alternative environment, the subscriber can define distribution lists to designate more than one subscriber to receive the WIM message. Accordingly, when the subscriber selects the short message to be transmitted, the subscriber can also select a distribution list instead of entering another subscriber's telephone number. Accordingly, the personalized WIM message is sent to the subscribers specified in the distribution list.

In another alternative embodiment the subscriber can select one or more entries in the subscriber's personal address book (PAB). The PAB can be a list of names and telephone numbers stored, for example, in a central location such as in a network operator's database. The subscriber would select one or more entries in the PAB corresponding to telephone numbers of the people to whom the subscriber wishes to send the WIM message. The WIM message would then be sent to those people.

Shown below is an example of a WIM message sent from a subscriber's handset for initiating the sending of a pre-defined message to members of a distribution list.

11125

The code "111" is the WIM invoking short code; "2" is an identifier of the message (i.e., the message number); and "5" is an identifier of a pre-defined distribution list (i.e., the distribution list number).

In another embodiment of the invention, WIM messaging is applied to WAP-enabled networks and mobile stations. This embodiment of the invention solves the problems with conventional WAP-enabled mobile stations discussed above by allowing a subscriber to receive, view and send short messages while in a WAP session, as illustrated in the displays of the WAP-enabled mobile stations shown in FIGS. 4A–C.

Figure 5:
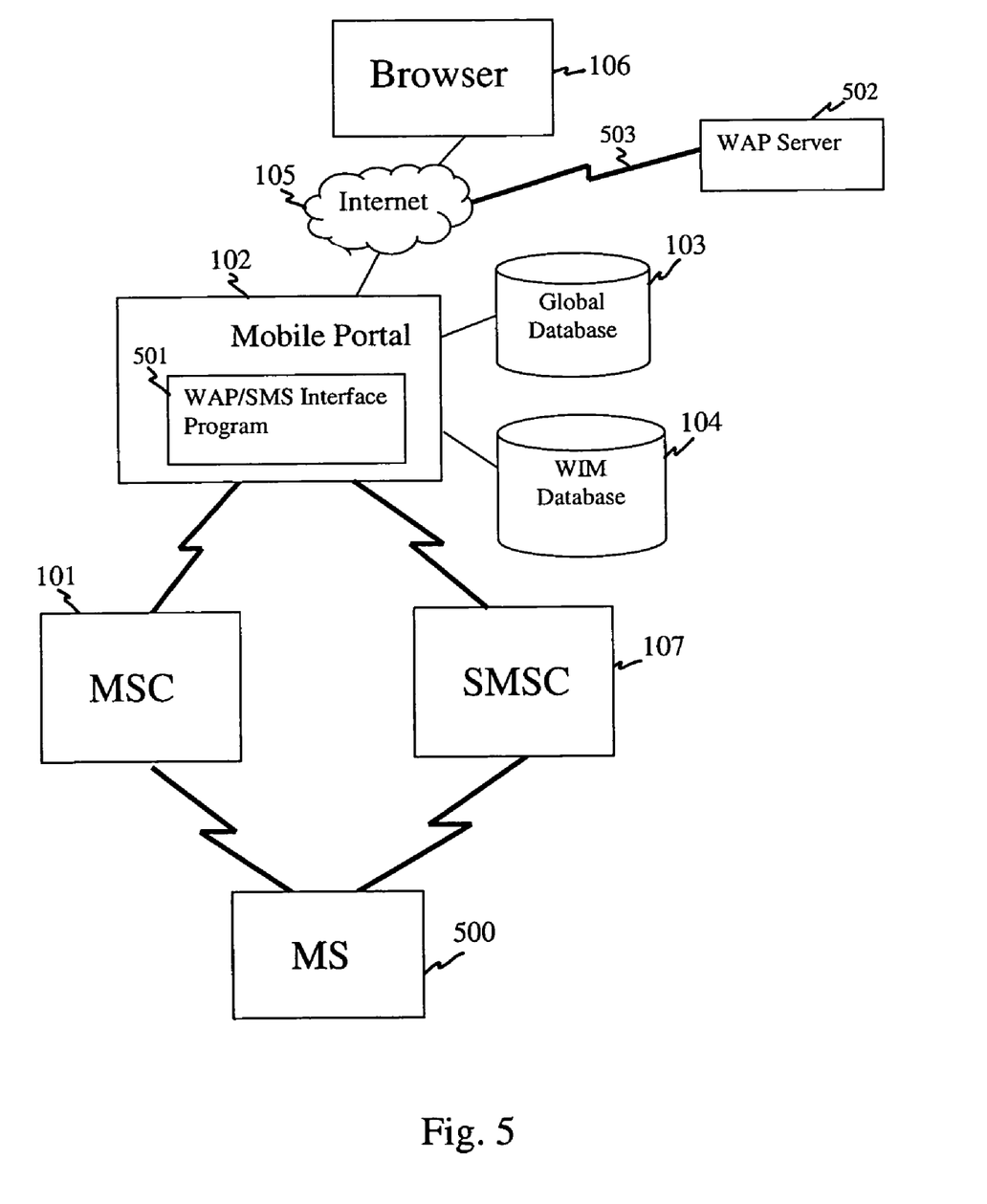
FIG. 5 is a system diagram of a WAP-enabled messaging system according to a preferred embodiment of the invention.

A WAP-enabled/MO-enabled network that supports WIM messaging, according to the invention, is shown in FIG. 5. Components in FIG. 5 bearing the same reference numerals as in preceding figures are identical to the corresponding components in those preceding figures, and accordingly, a description of those components is not repeated here.

In FIG. 5 a mobile station 500 is a WAP-enabled mobile station capable of communicating with a WAP server 502. In this embodiment the WAP server 502 communicates with the mobile portal 102 via a WAP session 503 over an Internet connection 105. WML pages are stored on the WAP server 502 for access by WAP-enabled mobile stations. In this embodiment of the invention the SMSC 107 sends a short message destined for the subscriber to the subscriber's mobile station 500, as usual, and also sends the short message to the mobile portal 102.

The mobile portal 102 includes a WAP/SMS interface program 501. Program 501 can be, for example, a JAVA applet. The WAP/SMS interface program 501 operates to insert and remove SMS messages from the WAP-enabled pages (e.g., WML pages) generated by the WAP server 502. For example, when mobile station 500 requests a WML page from WAP server 502, and the SMSC has a short message for delivery to the subscriber, the WAP/SMS interface program 501 receives the short message from the SMSC 107 and inserts it into the requested WML page received from WAP server 502.

Figure 4A:
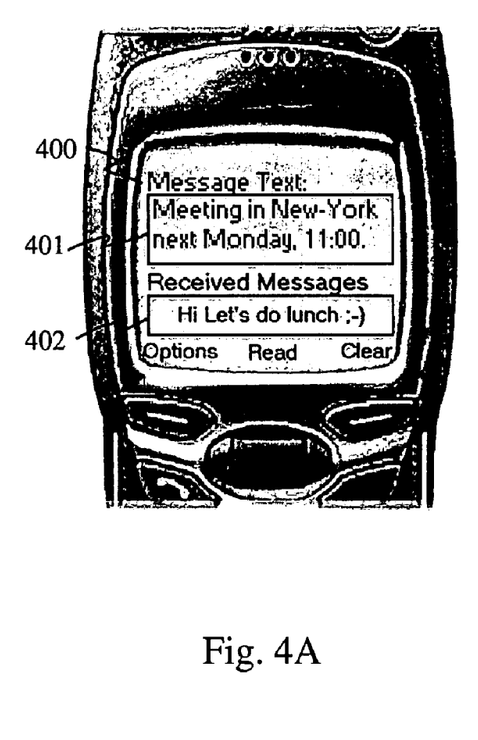
FIGS. 4A–4C show messaging related displays for a WAP enabled handset according to a preferred embodiment of the invention.

The user of a WAP-enabled mobile station 500 can send a short message by entering the message in a field on WAP screen displayed on the mobile station 500. Information entered on the WAP screen is sent via the mobile station's WAP session to the mobile portal 102. The WAP/SMS interface program 501 extracts the short message from the information sent from the mobile station 500 over the WAP session. The mobile portal 102 then sends the extracted short message to the SMSC 107 for delivery to the intended recipient. More specifically, when the subscriber, using his or her WAP-enabled mobile station, logs onto a WAP session and enters the URL of a WAP site resident on WAP server 502, a wireless markup language (WML) page is received that includes the following three fields, shown in FIG. 4.

Field 1: for entering the recipient's phone number (individual number, distribution list, or from PAB) or e-mail address.

Field 2: for entering the desired message text.

Field 3: for display of received WIM messages.

Figure 4B:
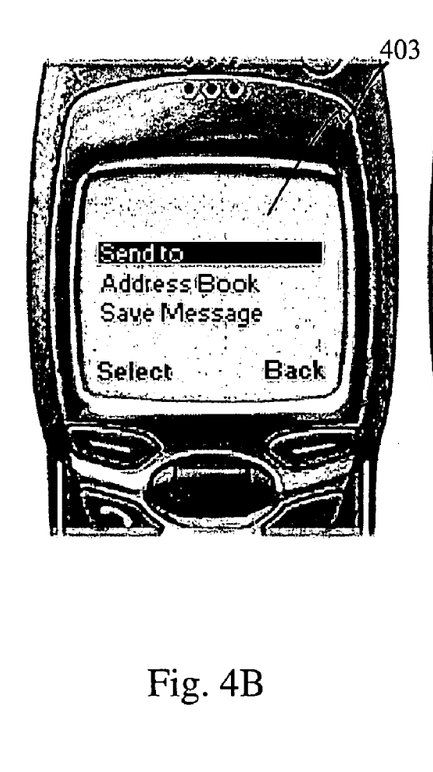
Figure 4C:
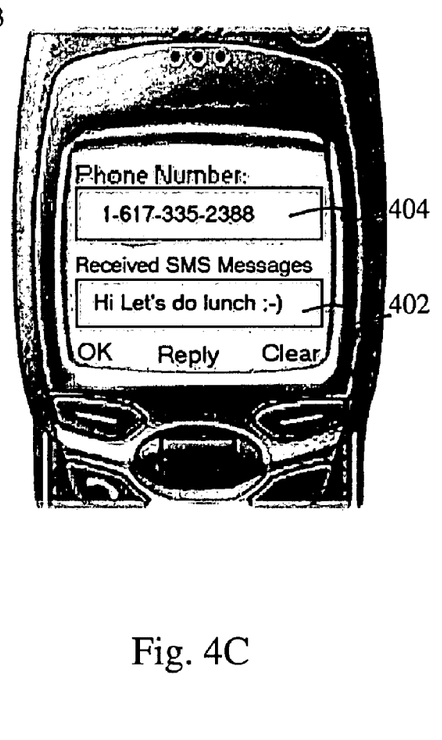

When information is entered into the above fields it is sent to the mobile portal 102. The mobile portal 102, and more particularly the WAP/SMS interface program 501, upon receiving the WAP information from mobile station 500, extracts the message entered into Field 2 and forwards it to a store and forward engine (SFE) in SMSC 107 for delivery to another mobile station or to an e-mail address. In this embodiment, instead of entering the desired text into field 2, the user can specify one of the pre-defined, personalized messages, i.e., WIM messages, in database 104. Preferred displays for the WAP-based WIM messaging are shown in FIGS. 4A–C. In FIG. 4A, the WAP screen 400 shown on the mobile station 100 contains on an initial screen two fields 401 and 402. The message text field 401 displays an entry field in which the subscriber can enter a message. Alternatively, the subscriber can enter a message number identifying one of the pre-defined, personalized messages stored in database 104. In field 402, received messages are displayed.

After entering the message text 401 and selecting or entering a message number, the next screen 403 shown in FIG. 4B allows the subscriber to select whether to choose a telephone number from an address book or to save the message for future use. Assuming the subscriber chooses the address book, the screen shown in FIG. 4C is displayed which contains a phone number field 404 as well as the received SMS messages field 402. The phone number field 404 contains a selection field for selecting the intended recipient's telephone number from a pre-stored address book. Alternatively, the phone no. field 404 is an entry field and the subscriber enters the intended recipient's telephone number.

Upon entering a phone number, the WAP message is sent to the WAP site indicated by the URL entered by the subscriber by way of the mobile portal 102. The message, extracted by WAP/SMS interface program 501, is sent to the SMSC for delivery to the specified recipient subscriber. Alternatively, the message can be routed to a system interacting with a data network to be sent as an e-mail, for example.

The WAP-enabled mobile station can also receive short messages while in the WAP session. The short message/WAP interface program 501 receives from SMSC 107 short messages intended for the subscriber, and stores those short messages in a storage area, such as a cache, designated for the subscriber. Here, the short messages intended for the subscriber and received from the SMSC 107 can be stored in the WIM database 104, although they could be stored in other storage areas. If a message is stored in the subscriber's storage area the program 501 will retrieve it. The program 501 then interacts with the WAP session and places the received message in the received messages field 402 of the WML page for display to a user.

Figure 6:
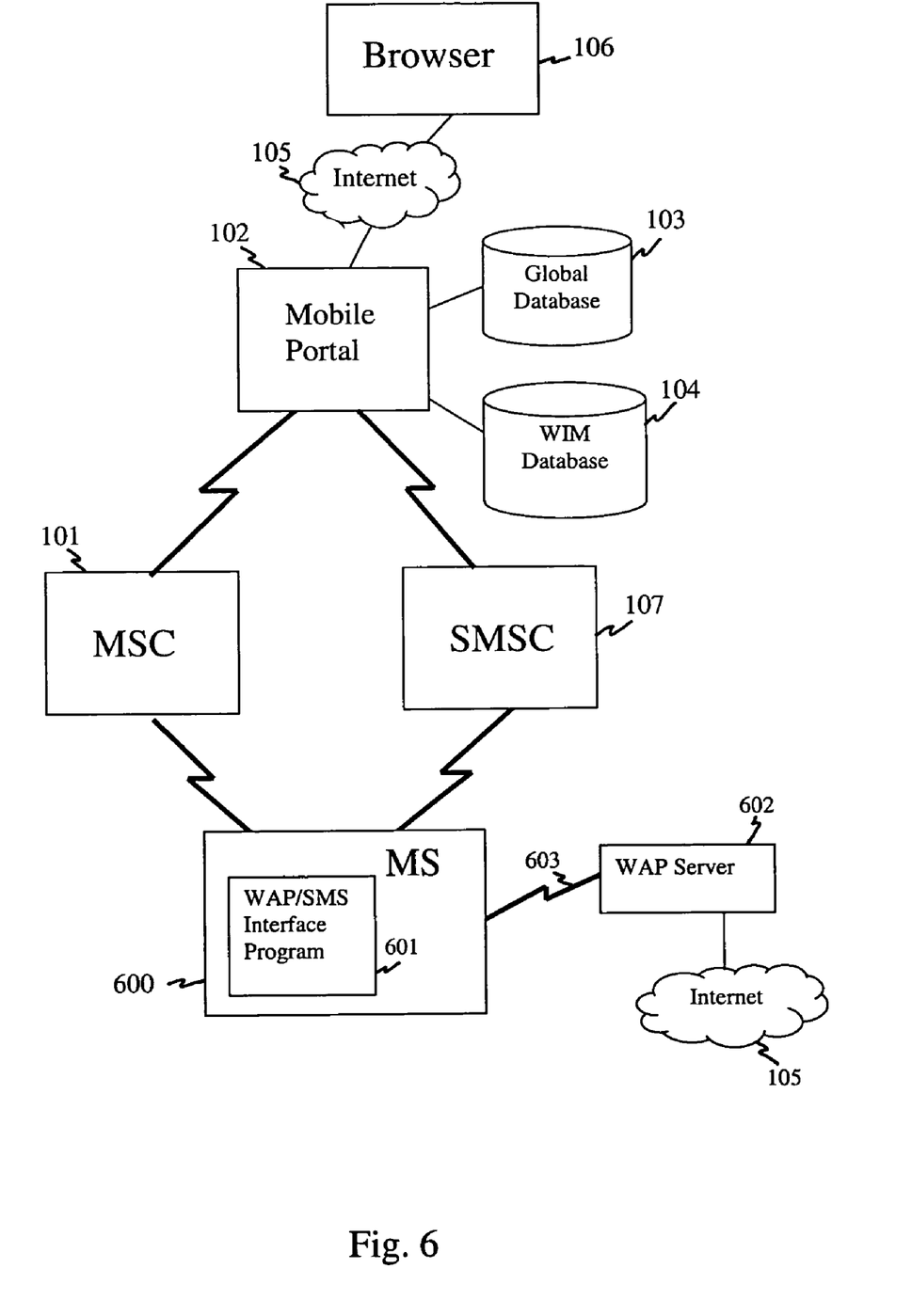
FIG. 6 is a system diagram of a WAP-enabled messaging system according to another embodiment of the invention.

In an alternative embodiment, as shown in FIG. 6, the WAP/SMS interface program 601 can be located in the mobile station 600. Here, program 601 can be, as with the previous embodiment, a JAVA applet. The WAP/SMS interface program 601 operates to receive short messages from the SMSC 107 and inserts them into the WML pages received from WAP server 602 over WAP session 603 for display on the WAP-enabled mobile station 600 as shown in FIGS. 4A and C. Program 601 also operates to extract messages entered in the message field 401. The messages are extracted by program 601 and sent to the SMSC 107 for delivery to the intended recipient.

Although the WAP sessions discussed above were described in terms of using WML pages, other types of formatted information can be handled. For example, CHTML, which is compressed HTML used in Japan for Imode phones can be sent and received over the WAP sessions discussed above.

The systems and methods described above will be understood by persons skilled in the art to be implemented on computer based devices. For example, the mobile station 100 can contain a microprocessor and a memory having recorded therein computer programs that when executed by the microprocessor cause the mobile station to operate as described above. Likewise, the MSC 101 and the SMSC 107 can be computerized devices programmed to perform the functions described above.

It will also be understood by persons skilled in the art that the principles of the invention described here can be applied to many different networks, including, but not limited to Wideband Code Division Multiple Access (Wideband CDMA), CDMA2000, and General Packet Radio Service (GPRS), IS-41, IS-138, IS-54 networks. It will also be understood that the information servers, although described in terms of WAP, can be any information server known now or later developed that provides formatted information for display on a mobile terminal. Likewise, although the formatted information is described in terms of WML pages, information formatted according to other standards, known now or developed later, such as Handheld Device Markup Language (HDML) would fall within the scope of the invention.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of sending messages in a wireless communication network, comprising:
   transmitting from a subscriber's mobile station to a control center a predefined message initiation code initiating a messaging session, a message identifier identifying a predefined, personalized message and an identifier of a receiving station, wherein the predefined, personalized message is designed by or on behalf of the subscriber.

2. The method according to claim 1, further comprising:
   receiving a message delivery notification at the mobile station indicating transmission of the personalized message to the receiving station.

3. The method according to claim 1, further comprising:
   retrieving the predefined message corresponding to the message identifier; and
   transmitting the retrieved predefined message to the receiving station.

4. The method according to claim 1, wherein the identifier of the receiving station is a telephone number.

5. The method according to claim 1, wherein the identifier of the receiving station is a distribution list identifier.

6. The method according to claim 1, wherein the wireless communication network is not enabled for mobile originated (MO) messaging.

7. The method according to claim 1, wherein the mobile station is a wireless application protocol (WAP) enabled mobile station.

8. The method of claim 1, wherein the wireless communication network is one of a Wideband Code Division Multiple Access (Wideband CDMA) network, a CDMA2000 network, a Time Division Multiple Access (TDMA) network, a General Packet Radio Service (GPRS) network, a IS-41 network, a IS-138 network, and a IS-54 network.

9. A method for receiving messages in a wireless communication network, comprising:
   receiving from a subscriber's mobile station a signal containing a predefined message initiation code initiating a wireless messaging sesssion, and a message identifier identifying a predefined, personalized message, wherein the predefined, personalized message is defined by or on behalf of the subscriber; and
   retrieving the predefined, personalized message identified by the message identifier.

10. The method according to claim 9, wherein the signal received from the subscriber's mobile station includes an identifier of a receiving station; the method further comprising transmitting the retrieved predefined message to the receiving station.

11. The method according to claim 9, further comprising:
    prior to receiving said signal, receiving the predefined message in a message definition mode;
    storing in a database the predefined message in association with an identifier of the subscriber and the message identifier.

12. The method according to claim 10, further comprising:
sending a message transmission notification to the subscriber's mobile station when the predefined message is transmitted to the receiving station.

13. The method of claim 9, wherein the wireless communication network is one of a Wideband Code Division Multiple Access (Wideband CDMA) network, a CDMA2000 network, a Time Division Multiple Access (TDMA) network, a General Packet Radio Service (GPRS) network, a IS-41 network, a IS-138 network, and a IS-54 network.

14. A system for wireless initiated messaging, comprising:
a personalized message database storing therein messages predefined by or on behalf of a subscriber and in association with the subscriber and a message identifier; and
a call control center coupled to the personalized message database,
wherein in response to receiving a signal comprising a predefined message initiation code to trigger sending a request to said database, a message identifier identifying one of the predefined messages, and an identifier of a receiving station, the call control center retrieves the predefined message from the personalized message database based on said message identifier and identifier of said receiving station and sends the retrieved predefined message to the receiving station.

15. The system according to claim 14, wherein the call control center transmits a message delivery notification to the mobile station that sent the signal, when the predefined message is sent to the receiving mobile station.

16. The system according to claim 14, wherein the call control center is part of a wireless communications network that does not support mobile originated (MO) messanging.

17. The system according to claim 14, wherein the call control center in response to receiving from the mobile station a signal containing the predefined message initiation code and a message identifier identifying an index control message, retrieves from the personalized message database the messages predefined for the subscriber and corresponding message numbers, and transmits said messages and message numbers to the mobile station.

18. The system of claim 14, wherein the system is a wireless communication network according to one of a Wideband Code Division Multiple Access (Wideband CDMA) network, a CDMA2000 network, a Time Division Multiple Access (TDMA) network, a General Packet Radio Service (GPRS) network, a IS-41 network, a IS-138 network, and a IS-54 network.

19. A mobile communications device, comprising:
a display;
an input unit for inputting a message number; a microprocessor;
a memory having recorded therein a computer program, wherein the computer program is executed by the microprocessor causing a predetermined short code and the message number to be transmitted; and if the message number input corresponds to a request for message information, the device receives the message information including messages predefined by or on behalf of a user and displays the received messages on the display as selectable messages.

20. The mobile communications device according to claim 19, wherein in response to the user selecting one of the displayed messages the device transmits the predetermined short code, an indicator of the selected message and a receiving device identifier to initiate delivery of the selected message to the receiving device identified by the receiving device identifier.

21. The mobile communications device according to claim 20, wherein the mobile communication device receives a message delivery notification indicating the selected message was delivered to the receiving device identified by the receiving device identifier.

22. The mobile communications device according to claim 19, wherein the mobile communications device operates according to a wireless application protocol (WAP).

23. The mobile communications device according to claim 19, wherein the mobile communications device operates in a wireless communication network that does not support mobile originated (MO) messaging.

24. The mobile communications device according to claim 19, wherein the receiving device identifier is a telephone number.

25. The mobile communications device according to claim 20, wherein the receiving device identifier identifies a distribution list.

26. A method of sending messages in a wireless communication network, comprising:
designing a personal, short communication message by a subscriber;
storing said message in a database;
transmitting from a subscriber's mobile station to a control center a message initiation code to initiate a query to said database, a message identifier identifying said personal message and an identifier of a receiving station;
transmitting a message identified by said message identifier to a receiver station.

27. The method of claim 26, wherein the wireless communication network is not enabled for mobile originated messaging.

28. The method of claim 27, wherein the wireless communication network does not support wireless application protocl (WAP).

29. The method of claim 26, wherein the wireless communication network supports mobile terminated messaging.

30. The method of claim 29, wherein the wireless communication network does not support wireless application protocl (WAP).

31. The method of claim 26, wherein said identifier of a receiving station is selected from an address book of said subscriber's mobile station.

32. The method of clam 31, wherein said identifier of a receiving station is a list with a pluraliry of receiver station identifiers.

* * * * *

UNITED STATES PATENT AND TRADEMARK OFFICE
CERTIFICATE OF CORRECTION

PATENT NO. : 6,956,831 B1
DATED : October 18, 2005
INVENTOR(S) : Eric Mahr

It is certified that error appears in the above-identified patent and that said Letters Patent is hereby corrected as shown below:

Title page,
Item [73], Assignee, should read -- Comverse Ltd., Tel Aviv (IL) --.

Column 13,
Line 36, delete "messanging" and insert -- messaging --.

Column 14,
Lines 47 and 52, delete "protocl" and insert -- protocol --.
Line 57, delete "pluraliry" and insert -- plurality --.

Signed and Sealed this

Seventh Day of February, 2006

JON W. DUDAS
*Director of the United States Patent and Trademark Office*